B. LIEBOWITZ.
PIVOT.
APPLICATION FILED AUG. 2, 1917.
1,305,815.
Patented June 3, 1919.
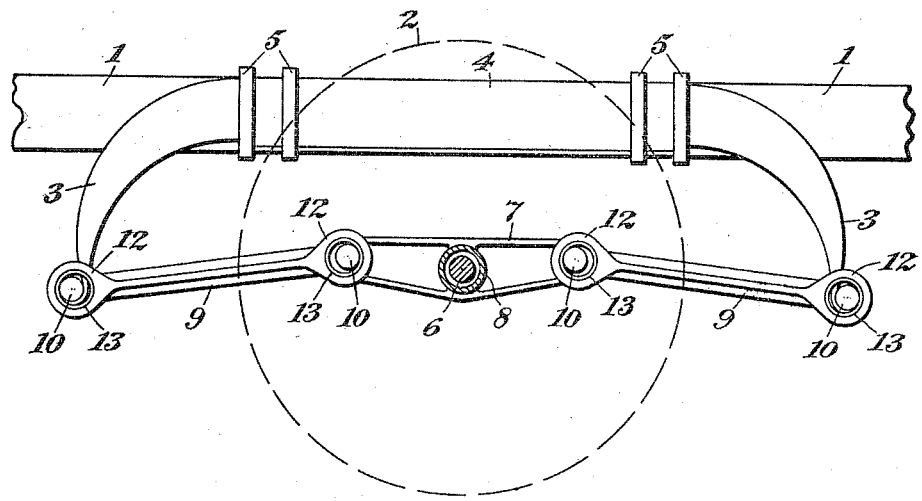
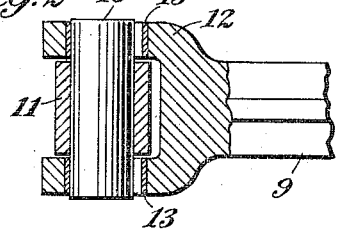
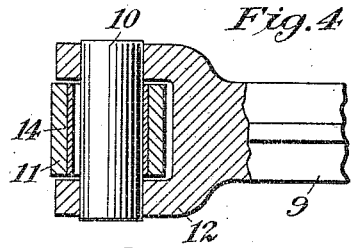
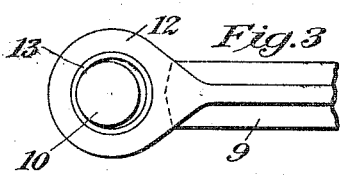
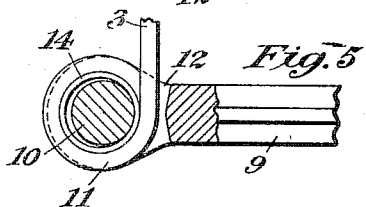
Inventor
Benjamin Liebowitz
By his Attorney

UNITED STATES PATENT OFFICE.

BENJAMIN LIEBOWITZ, OF NEW YORK, N. Y.

PIVOT.

1,305,815.   Specification of Letters Patent.   Patented June 3, 1919.

Application filed August 2, 1917. Serial No. 184,006.

*To all whom it may concern:*

Be it known that I, BENJAMIN LIEBOWITZ, a citizen of the United States, residing at the city, county, and State of New York, have invented certain new and useful Improvements in Pivots, of which the following is a specification.

My invention relates to a pivot for connecting two relatively movable members which maintain said pivot continuously under load, and is particularly applicable to vehicle suspensions of the kind described in my co-pending applications, Ser. No. 869,725 filed Nov. 2, 1914, and Ser. No. 93,837 filed April 27, 1916.

The object of the invention is to provide a pivot construction which offers negligible frictional resistance to small angular displacement of the connected members but which introduces a desired amount of friction when the displacement exceeds a prescribed degree. In application to a vehicle suspension such a device operates to quickly dampen the oscillations of the suspended body when they exceed a predetermined amplitude.

I attain these ends by means of a pivot comprising a pin and bearing which are constructed and arranged so as to have rolling contact for small displacements and sliding contact for larger displacements of the connected members.

In the accompanying drawings illustrating my invention, Figure 1 is a diagramatic side view of a vehicle suspension employing my invention, showing the driving shaft and housing in section; Fig. 2 is a detail sectional view of one form of pivot; Fig. 3 is a side view of the same; Fig. 4 is a detail sectional view of a modified form; and Fig. 5 is a side view of the modification, partly in section.

Similar characters refer to similar parts throughout the several views.

For the purpose of illustrating my invention I have shown it in Fig. 1 of the drawing as applied to the rear suspension of a shaft driven motor vehicle.

Referring to the drawings, 1 indicates a frame, 2 a wheel, 3—3 leaf springs secured in the ends of a channel 4 by means of clips 5. The springs 3—3 being under a considerable initial strain as described and for the purposes set forth in my above-mentioned patent applications. 6 indicates a driving shaft, 7 a yoke or member rigidly secured to the axle housing 8, and 9—9 are a pair of tension members pivotally secured at their ends to the yoke and spring respectively. The parts heretofore described are merely incidental to my present invention.

Since the springs are always under strain, the pivotal connections of the tension member to the spring and yoke respectively are always under load. This condition is essential to the successful operation of my invention as otherwise the parts of the pivotal connection would pound and produce other undesirable results.

I now come to a description of the pivot construction to which this invention particularly relates and which, in one form, is shown in Figs. 2 and 3 of the drawings. In said figures 10 indicates a pin, preferably made of hardened steel and substantially cylindrical in form. The pin is rigidly held in an eye 11 which eye forms a part of the springs 3 or the yoke 7 as the case may be. The ends 12 of the tension members 9 are forked, as shown, each fork having a hole provided with a tightly fitting bushing 13 of larger diameter than that of the pin and preferably made of hardened steel. The bushings are in alinement and serve as bearings for the ends of the pin.

In the modification shown in Figs. 4 and 5, the pin 10 is rigidly secured in the forked end 12 of the tension member instead of being held in the eye 11 as heretofore described. In this instance the hole in the eye 11 is provided with a bushing 14 of larger diameter than the pin and forming a bearing for the intermediate portion of the pin.

An essential feature of my construction consists in having the diameter of the bearing larger than the diameter of the portion of the pin which works in said bearing, whereby to obtain rolling contact for a prescribed range of angular movements of the connected members and sliding contact beyond said range. By actual experiment with a suspension of the type shown in Fig. 1 I have found that where the pin and bearings are made of hardened steel, a difference in diameter of from 5 to 10 per cent. gives satisfactory results. I have also found that the parts will work without appreciable wear even if not lubricated. The use of a suitable lubricant is however advisable to insure smooth wearing.

The mode of operation of the device is as follows. Relative movements of frame and axle of the suspension shown in Fig. 1 produce angular displacements of the tension members 9—9 which vary in degree according to the amount of such movement. Now as the bearings are larger in diameter than the pins and as said parts are held firmly in contact by the tensile force produced by the springs, the pin and bearing will have a rolling contact for a limited range of angular displacements of the tension members from equilibrium, and a sliding contact beyond said range. According to well known laws of mechanics, and depending on the difference in diameters of the pins and bearings and on the coefficient of friction of the materials of which they are made, said parts can be designed so that the transition from rolling to sliding contact will be effected at any desired angular displacement of the tension members.

During the prescribed range of displacements the pivotal connections work with a negligible friction but upon larger displacements there is a frictional resistance due to the sliding contact of the parts of the pivot construction. The amount of this friction can be controlled by the design. This operates to quickly dampen the oscillations when they exceed a predetermined amplitude without necessity of having recourse to an external shock absorber or other auxiliary device.

I am aware that pivots have heretofore been constructed in which the diameter of the pivot pin is considerably smaller than that of the pivot bearing, but in all such pivots the parts have always been in rolling contact; for example, as in an ordinary knife-edge or rocker pivot having a dull or rounded edge. I am the first to devise a pivot construction in which the contact of the parts changes from rolling to sliding upon exceeding a predetermined angular displacement of the connected members.

What I claim is:

1. A pivot for connecting two relatively movable members which maintain said pivot continuously under load, comprising a pin secured to one member, and a bearing for the pin secured to the other member, the diameter of the bearing being larger than that of the pin and the ratio of said diameters being such that for a predetermined range of relative angular displacement of the members the pin and bearing have rolling contact and beyond said range sliding contact.

2. The combination with a member having a forked portion, and a second member having a portion inserted between the forks of the first mentioned member of a pivotal connection maintained continuously under load by said members and comprising a pin secured to one member and a bearing for the pin secured to the other member, the diameter of the bearing being larger than that of the pin, the ratio of said diameters being such that for a predetermined range of angular movements of said members relative to each other the pin and bearing have rolling contact and beyond said range sliding contact.

3. The combination with a member having a forked portion and a second member having a portion inserted between the forks of the first mentioned member; of a pivotal connection maintained continuously under load by said members and comprising a hardened steel pin secured to one member and hardened steel bearing for the pin secured to the other member, the diameter of the bearing being approximately from three per cent. to 12 per cent. larger than that of the pin, whereby for a predetermined range of angular movements of said members relative to each other the pin and bearing will have a rolling contact and beyond said range a sliding contact.

4. In a vehicle suspension, an initially strained spring, a tension member, and a pivot for connecting said parts, said pivot comprising a pin secured to one part, a bearing secured to the other part, the diameter of the bearing being larger than the diameter of the pin, and the ratio of said diameters being such that the pivot operates to dampen the oscillations of the suspended body when they exceed a predetermined amplitude.

BENJAMIN LIEBOWITZ.